United States Patent Office 3,573,894
Patented Apr. 6, 1971

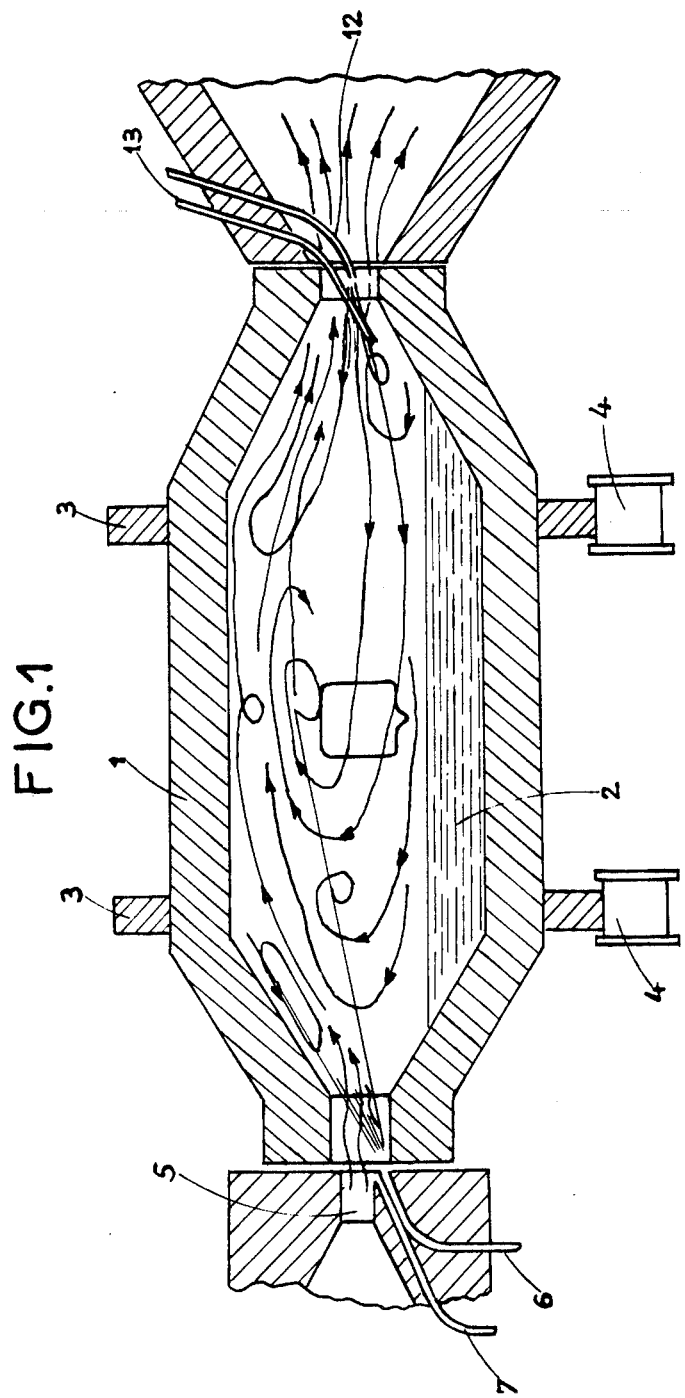

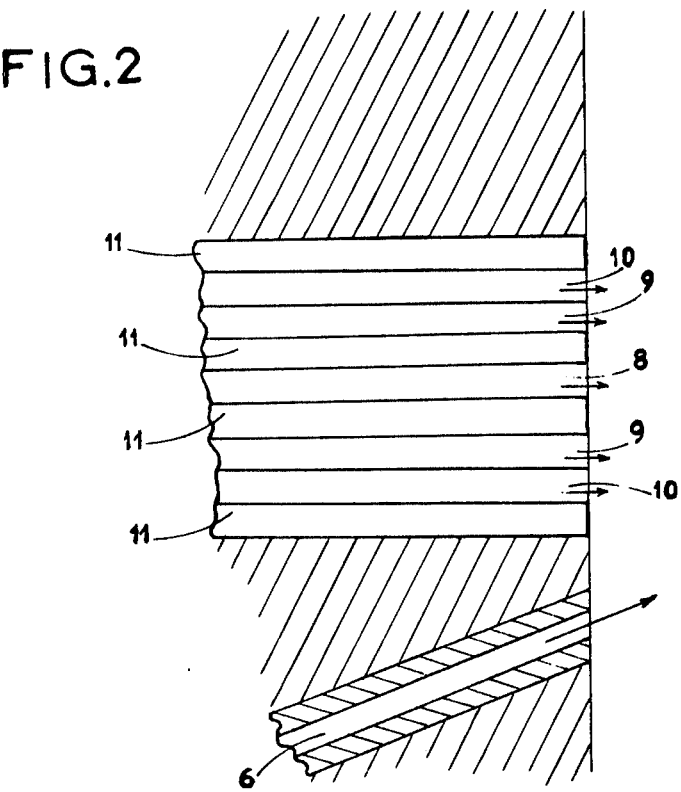

3,573,894
PROCESS AND PLANT FOR REDUCING METALLIC OXIDES
Pierre Marie Francois Fourt, 15 ter Avenue Clodoald, Saint-Cloud, Hauts-de-Seine, France
Continuation-in-part of abandoned application Ser. No. 532,719, Mar. 8, 1966. This application June 14, 1968, Ser. No. 753,817
Claims priority, application France, Mar. 18, 1965, 9,764
Int. Cl. C21b *11/06*
U.S. Cl. 75—20                             2 Claims

ABSTRACT OF THE DISCLOSURE

Metallic oxides are reduced in a rotating furnace heated by a burner at one end of the furnace producing a flame above the charge with oxygen blown into the flame through a plurality of nozzles and with introduction into the flame of a part of the particles of metallic oxides to be reduced. The total quantity of oxygen added to the flame is insufficient for complete combustion of the combustible materials emerging from the burner so as to maintain a reducing zone adjacent the burner. The remainder of the metallic oxides to be reduced are introduced at the other end of the furnace and additional oxygen is supplied adjacent the smoke outlet at the other end of the furnace for oxidation of the reducing gases in the smoke and for additional heating of the furnace. A bath of reduced metal is maintained in the bottom of the furnace.

CROSS REFERENCE TO RELATED APPLICATION

This application is a continuation-in-part of application Ser. No. 532,719, filed Mar. 8, 1966, for Process and Plant for Reducing Metallic Oxides, which application is now abandoned.

BACKGROUND OF INVENTION

In pending United States application Ser. No. 511,991 filed by Jean Bouchet on Dec. 6, 1965, entitled "Direct Reduction of Ores Difficult to Reduce," a process is described for accelerating the direct reduction of metallic oxides by adding to the charge particles of metallic iron.

Tests were conducted on Brazilian hematite mineral from Itabira heated to 1000° C. after an addition of 40% of fine grained metallurgical coke. The mineral and coke are in granular form about 2 mm. in diameter. Removal of oxygen from the mineral occurs at first primarily from $Fe_2O_3$ followed by $Fe_3O_4$ and finally from FeO.

However, a certain overlap of the phases occurs, and at the end of about 20 minutes of heating, the following percentages of oxides are obtained:

$Fe_2O_3$: 2%, $Fe_3O_4$: 68%, FeO: 30% but iron has not yet appeared in the metallic state.

Practically speaking, it is only when $Fe_2O_3$ has completely disappeared with improvement in the amount of $Fe_3O_4$ and FeO that measurable quantities of metallic iron can be found. For example, at the end of 30 minutes of heating the following phases are found:

$Fe_3O_4$: 32%, FeO: 63%, metallic iron: 5% after forty minutes of heating, $Fe_3O_4$ disappeared and the following remained:

FeO: 80%, metallic iron: 20% in the mass undergoing reduction.

Reduction of FeO then continues. After 80 minutes, the metallic extraction is practically completed. But a preliminary step of about 23 minutes must be completed at the beginning of the reduction before disappearance of $Fe_2O_3$ and the appearance of metallic iron.

Application Ser. No. 511,991 shows that it is possible to considerably reduce the duration of this preliminary step and even to eliminate it, practically speaking, by adding, when the charge is at a temperature sufficient for reduction, a small amount of powdered metallic iron to the mineral charge containing the reducing agent. This addition need not be large and is sufficient if from one to two percent of the total iron in the operation. The reduction of metallic iron begins immediately after the addition of powdered metallic iron in spite of the presence of $Fe_2O_3$ not yet reduced to $Fe_3O_4$. Thereafter, the total reduction of the charge is carried out in a much shorter time.

Operating under the same conditions as above at 1000° C. on Itabira mineral mixed with 40% of coke in granular form with an addition of 1 to 1½ percent powdered iron at the beginning of the operation, metallic iron appeared at the very beginning of the operation and $Fe_2O_3$ disappeared completely at the end of 20 minutes of heating.

After 40 minutes of heating, there was only 20% FeO and 80% metallic iron. Total reduction was obtained after 60 minutes of heating.

Thus the addition, at opportune time, of a very small amount of powdered iron provided a gain in time of 25% with respect to known procedures corresponding to present practices.

SUMMARY OF THE INVENTION

It is an object of the present invention to provide a process for the reduction of metallic oxides for total or partial reduction of minerals or intermediate products such as minerals already partially reduced.

The metallic oxides reduced by the present invention are those of the metals used in the steel industry, such as iron, as well as metals which are not easy to reduce such as chromium, manganese and vanadium. The invention particularly relates to minerals whose oxides have various degrees of oxidation.

The following description will deal primarily with iron which has various degrees of oxidation but iron should be considered only as the particular example for purposes of illustration. The degrees of oxidation of iron are found in the following oxides:

$Fe_2O_3$, $Fe_3O_4$ and FeO

The present invention utilizes a furnace rotating about a non-vertical axis preferably horizontal, heated above the charge by a burner and the flame of the burner is subjected to oxygen blown in by one or more jets together with means for introducing into the flame pulverized particles of the metallic oxide to be reduced.

In such a furnace, the mineral introduced in pulverized form in the flame is heated by the flame and can be reduced, at least partially, if the flame is maintained as a reducing flame, the furnace further containing quantities of the minerals to be reduced and at least one reducing agent forming the reduction bath.

The present invention utilizes the above-described process further utilizing the reducing properties of the suitably controlled flame of the burner.

If a powder of a finely pulverized mineral having a maximum diameter of 300 microns is projected into the hot reducing portion of a flame fed by a gaseous fuel such as natural gas, in a fraction of a second, from one-fifth to one-half a second, the mineral grains undergo an important change on the surface. For this change, the temperature at the surface of the grain should range from 1000 to 1300° C. and the atmosphere of the flame should have the relationship $CO/CO_2$ 3 increasing to a temperature above 1300° C. The mineral grain does not have time to reach the temperature of the flame but its surface is completely changed.

This transformation occurs with the appearance of a minor surface coating of metallic iron, usually discontinuous, on a continuous layer of FeO while the central part of the grain remains as $Fe_2O_3$ or as $Fe_3O_4$, in accordance with the nature of the mineral, and is no longer in direct contact with the atmosphere of the furnace, a small amount of powder thus prepared, added to a larger amount of the mineral, 5 kilogs of prepared powder in 100 kgs. of mineral to be reduced, is sufficient to trigger a rapid reduction of the metal and provides the advantages above described.

In accordance with the invention, oxygen is blown into the flame in insufficient quantity for complete combustion of the combustible materials leaving the burner so as to maintain at the mouth of the burner a reducing zone and a supplementary quantity of oxygen is introduced near the smoke exit of the furnace for combustion of the reducing gases contained in the smoke.

This process has particular advantage for the partial or total elimination of oxygen from metallic oxides not requiring a strong reducing gas. In this case, the flame can reduce the metallic oxide while maintaining an elevated temperature associated with the partial combustion of carbon monoxide and hydrogen. The emissive power of the carbon monoxide and water vapor is then improved by the incandescent particles of the pulverized product being treated.

DESCRIPTION OF THE DRAWINGS

The present invention will now be described with reference to a preferred embodiment of the process with reference to structures shown in the accompanying drawings in which FIG. 1 is a longitudinal section of apparatus for carrying out the present process; and FIG. 2 is a detail on larger scale of the burner of the furnace and the jet for supplying oxygen to the flame.

DESCRIPTION OF PREFERRED EMBODIMENT

The furnace shown in the drawings has a rotating body 1 of cylindrical form closed at each end by a truncated conical part and containing charge 2. The furnace is supported on rings 3 turning on rollers 4. The furnace is rotated by one or more ring gears not shown and has two types of movement. One of the movements is continuous rotation, the speed of which can be limited to ten revolutions per minute during the reduction phases and the other movement is alternate rotation in one direction or the other.

A burner 5 using pulverized or fluid fuel directs a flame into the interior of the furnace. The direction and degree of combustion of the flame are controlled by a jet of oxygen provided by conduit 6.

FIG. 1 schematically shows burner 5 and a preferred construction for burner 5 will be described hereinafter with respect to FIG. 2.

The particles of the product to be treated, pulverized mineral or pulverized mineral already prereduced, are injected by means of a jet 7 or are introduced through burner 5. Injection of the products to be treated into the furnace can be obtained by utilizing an inert carrier gas such as nitrogen or an active gas such as air, oxygen, hydrogen or methane. The ratio of the mass of the pulverized products to the injection gas is high and at least equal to one.

FIG. 2 shows how the pulverized products can be introduced into the furnace through the principal burner. The jet of this burner can be constructed of concentric rings forming passages for oxygen, natural gas and the mineral with water cooling manifolds between these passages.

The jet shown in FIG. 2 has a central conduit 8 for the pulverized mineral, an annular conduit 9 for natural gas and an outer conduit 10 for oxygen.

Channels or manifolds 11 are provided for cooling water.

FIG. 2 also shows conduit 6 providing the jet of oxygen which deflects the flame toward the top of the furnace.

The cross-sections and the pressures are so chosen as to give the oxygen jet from conduit 6 and the jet of fuel from annular conduit 9 a very strong force. The force of the jet of the product to be reduced leaving conduit 8 is weaker and is chosen in view of the forces of the jet of oxygen so as to avoid entraining the particles in the chimney draft of the furnace.

A supplementary jet of oxygen 12 is blown into the furnace in opposite directions to the preceding oxygen jet adjacent the exit of the furnace and the force of this supplementary jet is weaker than that of jet 6. The supplementary jet of oxygen creates an oxidizing zone at the exit of the furnace. Jet 12 is directed either in the axis of the furnace or is slightly inclined toward the bottom of the furnace, its pressure and direction being determined in each particular case to provide good combustion of the carbon monoxide and hydrogen, which would otherwise leave the furnace without being burned, without combustion of the metallic vapors in the smoke, which vapors are later obtained from the smoke.

The installation as above-described has three distinct zones:

The first zone exists at the nose of burner 5 and is of weak or average reducing power. It includes the incompletely burned products of combustion and pulverized particles of mineral to be reduced.

The proportion of the minerals treated in the flame ranges from 5 to 10% of the total charge. It is finally pulverized in such a way as to expose a large surface to the gases of the flame. The size of the grain should not exceed 300 microns in diameter. The grains introduced into the flame remain there from ⅕ to ½ second and attain a surface temperature of 1000 to 1300° C. The gases at the center of the flame have a ratio of $CO/CO_2$ equal at least to 3.

The quantity of oxygen for combustion is so controlled that there exists in this first zone sufficient amounts of carbon monoxide and hydrogen for at least partial extraction of the oxygen in the particles of mineral injected into the flame.

As a matter of practice, during the time of injection of metallic powder into the flame, the quantity of oxygen furnished to the flame should not exceed 60% of that which would be stoichiometrically necessary for complete combustion of the fuel.

Injection of the metallic powder should take place when the principal charge located at 2 (FIG. 1) reaches the reduction temperature in practice from 800 to 1000° C.

Between the times of injection of the metallic particles, the quantity of oxygen furnished to the flame of burner 5 should exceed the proportion of 60% indicated above.

The caloric power of burner 5 is so calculated as to bring the charge located at 2 to the reduction temperature in view of the additional heat provided by the oxygen introduced at 12 to provide total combustion of the reducing gases.

As will be seen hereinafter, it is the oxygen added at 12 which provides combustion of the gases created by reduction (CO) when reduction has started.

Conduit 6 provides burner 5 with the amount of oxygen as defined above. The force of the jet is controlled to force into the flame the pulverized mineral furnished by conduit 7. It follows, obviously, that after transformation in the flame, the pulverized mineral falls on the charge to be reduced which is shown by reference 2 and which occupies the central part of the furnace.

It should be noted that the combustion of the flame of burner 5 by oxygen from jet 6, which oxygen is insufficient for total combustion, however provides a combustion temperature which exceeds 1300° C. and reaches 1500–1700° C. It is necessary to provide conditions such that the mineral grains which pass through the flame are not vitrified on their surface. Vitrification occurs between 1400 and 1550° C., depending upon the character of the mineral. Vitrification would cause reduction at the center of the grains to $Fe_2O_3$ or $Fe_3O_4$. However, the short time the grains remain in the flame leaves the surface of the grains at a temperature at which vitrification does not occur.

The second zone is constituted by the central cylindrical part of the furnace containing charge 2. The pulverized residues of the mineral injected into the flame in the first zone fall upon this charge which is made up of the principal part of the mineral to be reduced and the necessary carbonaceous reducing agent. The principal part of the charge is introduced into the furnace either by a door in the middle of the length of the furnace or by tubes 13.

The succession of operating steps and corresponding temperatures in this second zone are as follows:

(1) Heating to 900° C. by burner 5 fed with oxygen through conduit 6.

(2) Injection of pulverized mineral in the first zone through the flame of burner 5 which continues to heat.

(3) Reduction of the charge while the temperature increases from 1000 to 1450° C. In this interval the reduction is very active because the Boudouard reaction is triggered with great speed as soon as step 2 is completed and because the temperature increases by reason of the combustion of carbon monoxide produced by the reaction in which carbon monoxide is burned by the oxygen introduced at 12, as will be further described hereinafter. The rotation of the furnace which causes the still solid charge to roll on the refractory wall provides very good penetration of heat into all of the charge. Grains of hematite mineral two millimeters in diameter are reduced to the metallic state in from 15 to 20 minutes after the charge reaches 1000° C.

(4) At 1450° C., the reduction is completed and the liquefication of the iron occurs at this temperature as drops of pig iron containing about 3% carbon which collect in a homogeneous bath.

(5) Continuation of the flow of oxygen at 12 burns the remaining carbon monoxide and in several minutes the temperature increases to 1600° C. From 8 to 15 minutes after the formation of the pig iron bath the metal is almost completely decarburized.

The third zone provides oxidation of the gases coming from the incomplete combustion of fuel adjacent burner 5 and primarily oxidation of the carbon monoxide, as described above, released by reduction of the mineral by the carbon in the charge.

This zone is located in FIG. 1 adjacent the cone which closes the right end of the rotary furnace and adjacent the opening of oxygen jet 12. This part of the furnace produces about 9/10 of the heat energy necessary for the reduction operation and for fusion of the iron. Burner 5 produces the remaining 1/10 which serves primarily to bring the charge to the temperature of 900° C. and to prepare it for reduction.

The purpose of the third zone is to obtain maximum use of the energy of the fuel without oxidizing the metallic vapors which are found in this zone. The extent of this zone into the furnace is so controlled as to obtain the most complete combustion possible of the carbon monoxide derived from the gases of combustion or from the reduction of the metal by the carbon in the charge in the second zone. The third zone should also provide practically combustion possible of the hydrogen present.

The amount of oxygen furnished by jet 12 to complete the burning of the vapors from burner 5 is important. The carbon monoxide should be burned which results from the reduction of the mineral by the carbon which increased by the portion of the volume of carbon monoxide formed at 2 by reason of the reaction $$CO + \tfrac{1}{2}O_2 = CO_2$$

For this reason, the volume of oxygen furnished by jet 12 should not exceed 50% of the volume of the gases which pass toward the chimney. It follows that the oxidizing zone 3 filled by these vapors does not extend beyond the junction of the chimney cone with the cylindrical part of the furnace.

In this way, zone 2 remains a perfectly reducing zone during all of the time that carbon monoxide is generated there during the reduction of the mineral (step 3).

It is only at the beginning of step 4, as described above, that the oxygen coming from jet 12 can penetrate, if it has sufficient pressure, into zone 2 and there burn the remaining carbon or carry out step 5 of the operative procedure.

EXAMPLE

The above-described installation was used for reduction of iron oxides.

The interior diameter of the furnace was 1.8 m. and its interior length between the extremities of the cones was 6 cm.

The oxide introduced in pulverized form was the oxide of iron in the magnetic state obtained from magnetized roasting of Lorraine ore followed by magnetic separation and drying. Its grain size was between 0 and 300 microns.

Its composition was as follows:

$Fe_3O_4$: 77%, $SiO_2$: 6%, $Al_2O_3$: 5%, CaO: 9%

This oxide was blown in a stream of nitrogen through burner 5 at a rate of 60 kg. per hour with a nitrogen delivery of 30 cubic meters per hour.

The remainder of the iron oxides to be treated was made up of preheated or prereduced mineral and fluidized before being introduced into the furnace. This fluidized ore was introduced continuously by means of the jet 13 cooled by water with delivery of 1700 kg. of iron and the mineral per hour.

The dimensions of the particles of these oxides were between 0.2 and 2 mm.

These oxides analyzed as follows:

Metallic iron: 20%, $Fe^{++}$: 58%, $SiO_2$: 2%, $Al_2O_3$: 1.5%, CaO: 1%, MgO: .5%

These oxides had been previously mixed with powdered coke in the fluidization reactor and the reducing agent was therefore introduced at the same time as the oxides.

The fuel was methane introduced at the rate of 80 normal cubic meters per hour.

The amount of oxygen introduced by jets 6 was 300 normal cubic meters per hour and the oxygen introduced by jet 12 was 30 normal cubic meters per hour.

The operation was carried out continuously and the level of the metal reduced rose in the furnace. This metal had an intermediate composition between pig iron and steel.

When the level of the metal was sufficient for pouring the introduction of methane and pulverized magnetic oxide was stopped.

A Wastite was added through nozzle 13 and the oxygen supplied through the nozzles 6 and 12 controlled the amount of carbon in the bath before pouring.

Pouring took place every two hours.

What is claimed is:

1. Process for reducing pulverulent particles of metallic oxides in a furnace rotating about a non-vertical axis and heated by a burner using combustion materials located at one end of the furnace and producing a flame above the charge, the steps of subjecting the flame of the burner to oxygen through a plurality of nozzles, the total quantity of oxygen added into the flame being insufficient for complete combustion of the combustion materials emerging from the burner, maintaining a reducing zone adjacent to the burner, then introducing the principal part of the metallic oxides to be reduced at the end of the furnace away from the burner and heating the same to reducing temperature by the burner, then supplying additional oxygen adjacent the smoke outlet of the furnace opposite the burner for oxidation of the reducing gases in the smoke and for additional heating of the furnace, maintaining a bath of reduced metal in the bottom of the furnace, then introducing into the flame the remaining part of the pulverulent particles of metallic oxide to be reduced when the metallic oxides in the furnace reach reduction temperature, and then regulating the quantity of oxygen introduced into the flame to make the flame reducing.

2. Process as described in claim 1, the remaining part of the particles of oxide being introduced through the burner.

References Cited

UNITED STATES PATENTS

| | | | |
|---|---|---|---|
| 2,413,434 | 12/1946 | Cottrell | 75—40X |
| 2,900,248 | 8/1959 | Johannsen | 75—40X |
| 2,951,756 | 9/1960 | Cavanagh | 75—40 |
| 2,978,318 | 4/1961 | Kalling et al. | 75—43 |
| 3,033,673 | 5/1962 | Collin et al. | 75—34 |
| 3,157,489 | 11/1964 | Wiberg | 75—40 |
| 3,169,055 | 2/1965 | Josefsson et al. | 75—40 |

L. DEWAYNE RUTLEDGE, Primary Examiner

G. K. WHITE, Assistant Examiner

U.S. Cl. X.R.

75—40, 62, 91

PO-1050
(5/69)

UNITED STATES PATENT OFFICE
CERTIFICATE OF CORRECTION

Patent No. 3,573,894          Dated April 6, 1971

Inventor(s) Pierre Marie Francois Fourt

It is certified that error appears in the above-identified patent and that said Letters Patent are hereby corrected as shown below:

Column 6, line 4, "is mixed with it" should be inserted after --which--; line 38, "60" should be --600--; line 58, "30" should be --300--.

Signed and sealed this 6th day of July 1971.

(SEAL)
Attest:

EDWARD M. FLETCHER, JR.        WILLIAM E. SCHUYLER, JR.
Attesting Officer                Commissioner of Patents